United States Patent
Aaron

(10) Patent No.: US 8,265,550 B2
(45) Date of Patent: Sep. 11, 2012

(54) METHODS, SYSTEMS, AND COMPUTER-READABLE MEDIA FOR UTILIZING A REPEATING FUNCTION TO IMPROVE QUALITY OF SERVICE

(75) Inventor: Jeffrey A. Aaron, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 936 days.

(21) Appl. No.: 11/864,293

(22) Filed: Sep. 28, 2007

(65) Prior Publication Data

US 2009/0088070 A1    Apr. 2, 2009

(51) Int. Cl.
*H04B 7/185*    (2006.01)
(52) U.S. Cl. .......... 455/13.1; 455/7; 455/11.1; 370/279; 370/293
(58) Field of Classification Search ............... 455/11.1, 455/7, 13.1, 16; 370/226, 243, 246, 274, 370/279, 293, 315, 492, 501; 375/211
See application file for complete search history.

(56) References Cited

U.S. PATENT DOCUMENTS

| | | | | |
|---|---|---|---|---|
| 6,141,533 A * | 10/2000 | Wilson et al. | ................ | 455/11.1 |
| 6,731,905 B2 * | 5/2004 | Ogino et al. | ................ | 455/11.1 |
| 7,139,527 B2 * | 11/2006 | Tamaki et al. | ................ | 455/16 |
| 2002/0187746 A1 * | 12/2002 | Cheng et al. | ................ | 455/11.1 |
| 2003/0124976 A1 * | 7/2003 | Tamaki et al. | ................ | 455/15 |
| 2005/0227616 A1 * | 10/2005 | Takatani et al. | ................ | 455/11.1 |
| 2006/0046647 A1 * | 3/2006 | Parikh et al. | ................ | 455/11.1 |
| 2007/0015459 A1 * | 1/2007 | Okazaki | ................ | 455/11.1 |

* cited by examiner

*Primary Examiner* — Lana N Le
*Assistant Examiner* — Golam Sorowar
(74) *Attorney, Agent, or Firm* — Hope Baldauff Hartman, LLC

(57) ABSTRACT

Methods, systems, and computer-readable media provide for utilizing a repeating function to improve quality of service. According to embodiments, a method for utilizing a repeating function to improve quality of service is provided. According to the method a first mobile cellular device is selected. An instruction is transmitted to the first mobile cellular device instructing the first mobile cellular device. The instruction causes the first mobile cellular device to relay communications between the second mobile cellular device and the cellular service provider. The first mobile cellular device thereby provides the repeating function for the second mobile cellular device.

11 Claims, 3 Drawing Sheets

US 8,265,550 B2

METHODS, SYSTEMS, AND COMPUTER-READABLE MEDIA FOR UTILIZING A REPEATING FUNCTION TO IMPROVE QUALITY OF SERVICE

TECHNICAL FIELD

This application relates generally to the field of quality of service. More specifically, the disclosure provided herein relates to the field of cellular-related quality of service.

BACKGROUND

Cellular-related quality of service ("QoS") issues are a significant source of frustration for service providers as well as their customers. Common QoS issues include bandwidth limitations, jitter, delay and latency, packet loss, and interference. QoS issues may result in a number of problems for customers, potentially causing customers to change service providers. In one example, a customer may experience a "dropped call," in which a phone call unexpectedly ends. In another example, a customer may experience a slow data transfer rate that is not suitable for transferring high-bandwidth content, such as video and music. In yet another example, a customer may experience unacceptable quality of service, causing customer dissatisfaction ranging from annoyance to anger.

Metropolitan areas are commonly populated with skyscrapers and other large buildings and objects. These skyscrapers, when located between a cellular device and a cellular tower, may block the signal between the cellular device and the cellular tower and cause multi-path reflections. The result is that QoS may suffer because communication between the cellular device and the cellular tower may be partly or entirely lost.

SUMMARY

Embodiments of the disclosure presented herein include methods, systems, and computer-readable media for utilizing a repeating function to improve quality of service. According to one aspect, a method for utilizing a repeating function to improve quality of service between a cellular service provider and a second mobile cellular device is provided. According to the method, a first mobile cellular device is selected. An instruction is transmitted to the first mobile cellular device instructing the first mobile cellular device. The instruction causes the first mobile cellular device to relay communications between the second mobile cellular device and the cellular service provider. The first mobile cellular device thereby provides the repeating function for the second mobile cellular device. According to exemplary embodiments, this may include directing the device which will provide the repeating function to switch operating modes in order to accomplish the repeating function, for example to switch from a normal cellular device operating mode to a cellular repeater mode or a mixed mode.

According to another aspect, a system for utilizing a repeating function to improve quality of service between a cellular service provider and a second mobile cellular device is provided. The system includes a memory and a processor functionally coupled to the memory. The memory stores a program containing code for utilizing the repeater. The processor is responsive to computer-executable instructions contained in the program and operative to select a first mobile cellular device, and transmit an instruction to the first mobile cellular device. The instruction causes the first mobile cellular device to relay communications between the second mobile cellular device and the cellular service provider. The first mobile cellular device thereby provides the repeating function for the second mobile cellular device.

According to yet another aspect, a computer-readable medium having instructions stored thereon for execution by a processor to perform a method for utilizing a repeating function to improve quality of service between a cellular service provider and a second mobile cellular device is provided. According to the method, a first mobile cellular device is selected. An instruction is transmitted to the first mobile cellular device instructing the first mobile cellular device. The instruction causes the first mobile cellular device to relay communications between the second mobile cellular device and the cellular service provider. The first mobile cellular device thereby provides the repeating function for the second mobile cellular device.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The following detailed description is directed to methods, systems, and computer-readable media for utilizing a repeater to improve quality of service (QoS). In the following detailed description, references are made to the accompanying drawings that form a part hereof, and which are shown by way of illustration through specific embodiments or examples.

Skyscrapers and other large buildings and objects may fully or partially block a signal between a cellular device and a cellular tower. It may be noted that these skyscrapers are typically in metropolitan areas that may be occupied by large numbers of users of cellular devices. Thus, for any given user who is blocked by a skyscraper, it may be presumed that the given user may be surrounded, within a relatively short distance, by other users who are not blocked by a skyscraper or other obstacle. It is under this notion that embodiments described herein provide for selecting and utilizing one or more nearby cellular devices to serve as a repeater.

Figure 1:
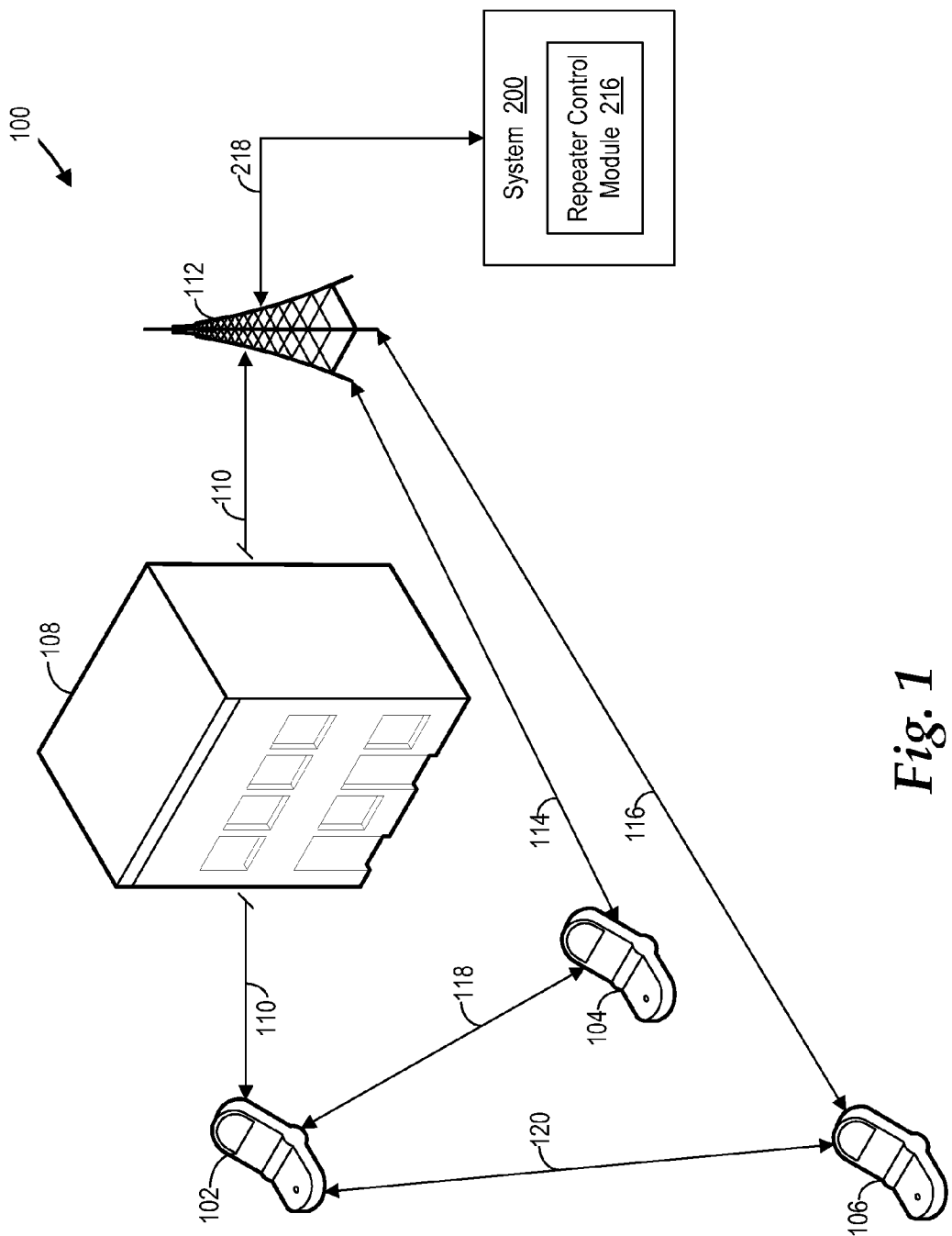
FIG. 1 is a high-level diagram illustrating an exemplary repeater configuration.

Referring now to the drawings, it is to be understood that like numerals represent like elements through the several figures, and that not all components and/or steps described and illustrated with reference to the figures are required for all embodiments. FIG. 1 is a high-level diagram illustrating an exemplary repeater configuration 100. The configuration 100 includes a first cellular device 102, a second cellular device 104, and a third cellular device 106. Examples of the cellular devices 102, 104, 106 may include, but are not limited to, cellular phones, smart phones, personal digital assistants ("PDAs"), and other suitable devices capable of communicating via a cellular network. As illustrated in FIG. 1, an obstruction 108, such as a building, blocks a first link 110 between the first cellular device 102 and a cellular tower 112. In particular, the obstruction 108 may affect the QoS of communications between the first cellular device 102 and the cellular tower 112. The second cellular device 104 and the third cellular device 106 have unobstructed or less-obstructed access to the cellular tower 112 as indicated by a second link 114 and a third link 116, respectively.

Because the second cellular device 104 and the third cellular device 106 have unobstructed access to the cellular tower 112, the second cellular device 104 and the third cellular device 106 may be considered as repeater candidates for the first cellular device 102, according to exemplary embodiments. As used herein, a repeater candidate refers to a cellular device that may serve as a repeater, which is essentially a proxy or conduit to the cellular tower 112. As the name suggests and as used herein, the repeater "repeats" a signal received from a source and forwards the signal to a destination. In one example, the first cellular device 102 may communicate with the cellular tower 112, and vice versa, by utilizing the second cellular device 104 as a repeater. In this case, instead of using the broken or partially impaired first link 110 to transmit a signal, the first cellular device 102 transmits the signal to the second cellular device 104 via a first repeater link 118. In response to receiving the signal, the second cellular device 104 retransmits the signal to the cellular tower 112 via the second link 114. The cellular tower 112 then communicates back to the first cellular device 102 using the reverse process, i.e., via first the second link 114 and then the first repeater link 118. In another example, the first cellular device 102 may communicate with the cellular tower 112, and vice versa, by utilizing the third cellular device 106 as a repeater. In this case, the first cellular device 102 transmits the signal to the third cellular device 106 via a second repeater link 120. In response to receiving the signal, the third cellular device 106 retransmits the signal to the cellular tower 112 via the third link 116. The cellular tower 112 then communicates back to the first cellular device 102 using the reverse process, i.e., via first the third link 116 and then the second repeater link 120.

By functioning as a repeater, the second cellular device 104 or the third cellular device 106 may enable the first cellular device 102 to communicate with the cellular tower 112 even though the conventional link (i.e., the first link 110) between the first cellular device 102 and the cellular tower 112 is broken or partially impaired. In a first embodiment, the second cellular device 104 or the third cellular device 106 may individually serve as a repeater. In a second embodiment, the second cellular device 104 and the third cellular device 106 may be utilized in conjunction to serve as a repeater. For example, the second cellular device 104 and the third cellular device 106 may each receive half or any other proportion of the signal from the first cellular device 102 and retransmit their respective proportion of the signal to the cellular tower 112. In this case, the cellular tower 112 or a system 200 may reassemble the two proportions of the signal received from the second cellular device 104 and third cellular device 106. In a third embodiment, the second cellular device 104 and/or the third cellular device 106 may be utilized to transmit only a part of the signal for the first cellular device 102. For example, the first cellular device 102 may be able to transmit a part of the signal to the cellular tower 112 via the first link 110. However, the first link 110 may be in such a condition (e.g., partially blocked by the obstruction 108) that utilizing the second cellular device 104 and/or the third cellular device 106 as a repeater may increase QoS. In this case, the cellular tower 112 or the system 200 may reassemble the portions of the signal received from the first cellular device 102 and at least one of the second cellular device 104 and the third cellular device 106. It should be appreciated that the use of two repeaters in FIG. 1 is exemplary and merely illustrative. In particular, any suitable number of repeaters may be used to enable the first cellular device 102 to communicate with the cellular tower 112.

In the second and third embodiments described above, by splitting the load between one or more of the first cellular device 102, the second cellular device 104, and the third cellular device 106, any potential drawbacks from relying on only one cellular device may be diminished. These potential drawbacks may include, but are not limited to, unfair reliance or excessive battery depletion on either the second cellular device 104 or the third cellular device 106. Further, it is important to note that the second cellular device 104 and the third cellular device 106 are primary devices for their respective users, according to exemplary embodiments. That is, the second cellular device 104 and the third cellular device 106 do not simply serve as "dumb" repeaters or for the exclusive benefit of the first cellular device 102 by enabling the first cellular device 102 to communicate with the cellular tower 112. As such, the usage of the second cellular device 104 and the third cellular device 106 as a repeater should not noticeably impact their usual operations and services for their respective users. It should be appreciated, however, that in some cases, such noticeable impact might be allowed, but likely with the recognition that users of the second cellular device 104 and the third cellular device 106 could be adversely affected and might become dissatisfied.

The cellular tower 112 is operatively connected to the system 200 via a network 218. According to exemplary embodiments, the system 200 includes a repeater control module 216. The system 200 and the repeater control module 216 are described in greater detail below with respect to FIGS. 2 and 3. It should be appreciated that the repeater control module 216 is shown included within the system 200 only as an illustrative example. In further embodiments, the repeater control module 216 may be included in the first cellular device 102, the second cellular device 104, the third cellular device 106, or any combination thereof.

Figure 2:
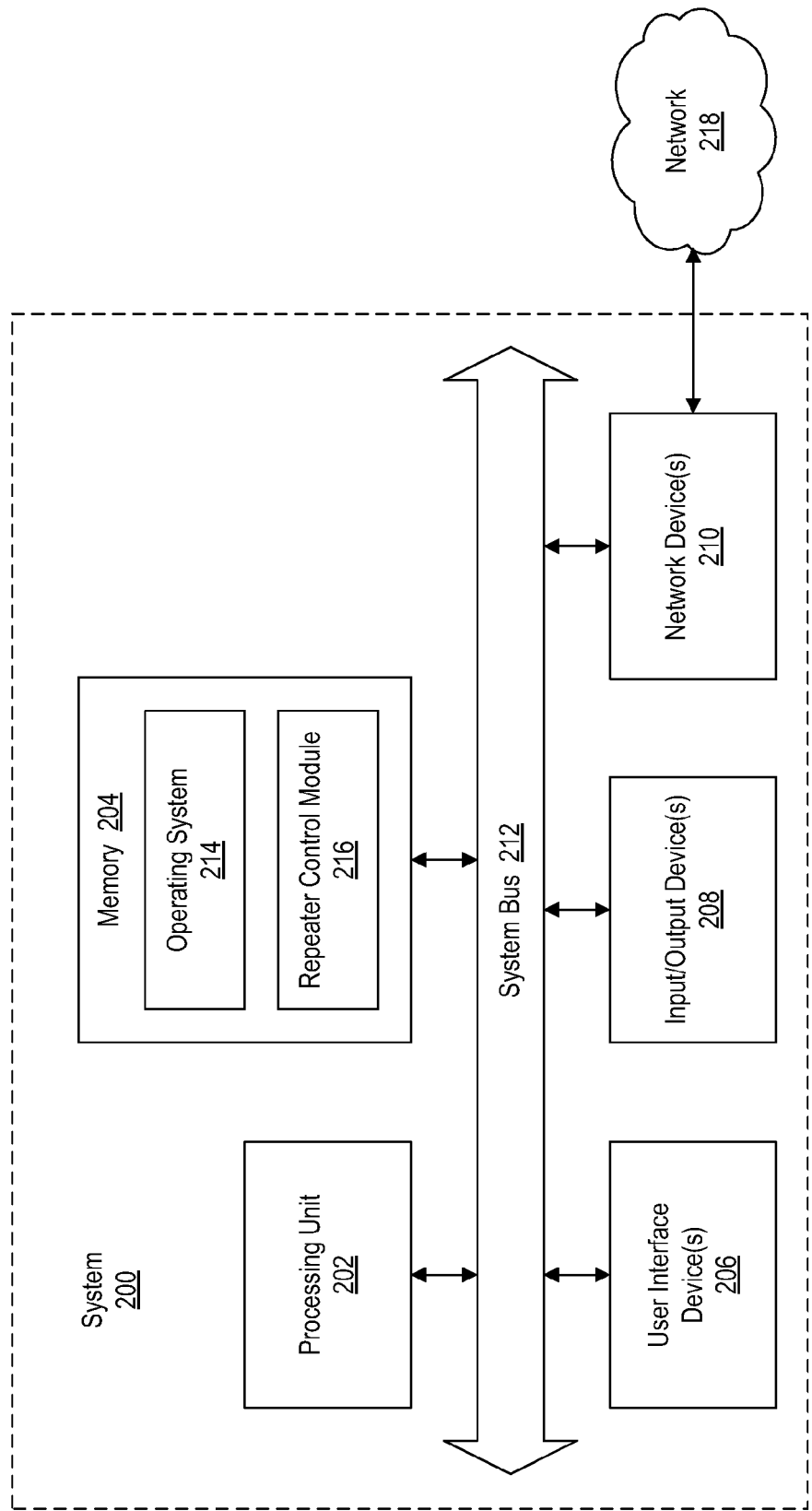
FIG. 2 is a block diagram illustrating a system configured to select and utilize a repeater to improve quality of service ("QoS"), in accordance with exemplary embodiments.

FIG. 2 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 2 is a block diagram illustrating the system 200 configured to select and utilize a repeater to improve QoS, in accordance with exemplary embodiments. As used herein, the term utilize may include, but is limited to, the operations of configuring, adapting, modifying, and changing operating modes and parameters. The system 200 includes a processing unit 202, a memory 204, one or more user interface devices 206, one or more input/output ("I/O") devices 208, and one or more network devices 210, each of which is operatively connected to a system bus 212. The bus 212 enables bi-directional communication between the processing unit 202, the memory 204, the user interface devices 206, the I/O devices 208, and the network devices 210. Examples of the system 200 include, but are not limited to, computers, servers, personal digital assistants, cellular phones, or any suitable computing devices.

The processing unit 202 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 204 communicates with the processing unit 202 via the system bus 212. In one embodiment, the memory 204 is operatively connected to a memory controller (not shown) that enables communication with the processing unit 202 via the system bus 212. The memory 204 includes an operating system 214 and the repeater control module 216, according to exemplary embodiments. Examples of operating systems, such as the operating system 214, include, but are not limited to, WINDOWS and WINDOWS MOBILE operating systems from MICROSOFT CORPORATION, MAC OS operating system from APPLE CORPORATION, LINUX operating system, SYMBIAN OS from SYMBIAN SOFTWARE LIMITED, BREW from QUALCOMM INCORPORATED, and FREEBSD operating system. In one embodiment, the repeater control module 216 is embodied in computer-readable media containing instructions that, when executed by the processing unit 202, performs a method for selecting and utilizing a repeater to improve QoS, as described in greater detail below with respect to FIG. 3. According to further embodiments, the repeater control module 216 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the system 200.

The user interface devices 206 may include one or more devices with which a user accesses the system 200. The user interface devices 206 may include, but are not limited to, computers, servers, personal digital assistants, cellular phones, or any suitable computing devices. The I/O devices 208 enable a user to interface with the repeater control module 216. In one embodiment, the I/O devices 208 are operatively connected to an I/O controller (not shown) that enables communication with the processing unit 202 via the system bus 212. The I/O devices 208 may include one or more input devices, such as, but not limited to, a keyboard, a mouse, or an electronic stylus. Further, the I/O devices 208 may include one or more output devices, such as, but not limited to, a display screen or a printer.

The network devices 210 enable the system 200 to communicate with other networks or remote systems via a network, such as the network 218. Examples of network devices 210 may include, but are not limited to, a modem, a radio frequency ("RF") or infrared ("IR") transceiver, a telephonic interface, a bridge, a router, or a network card. The network 218 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 218 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 3:
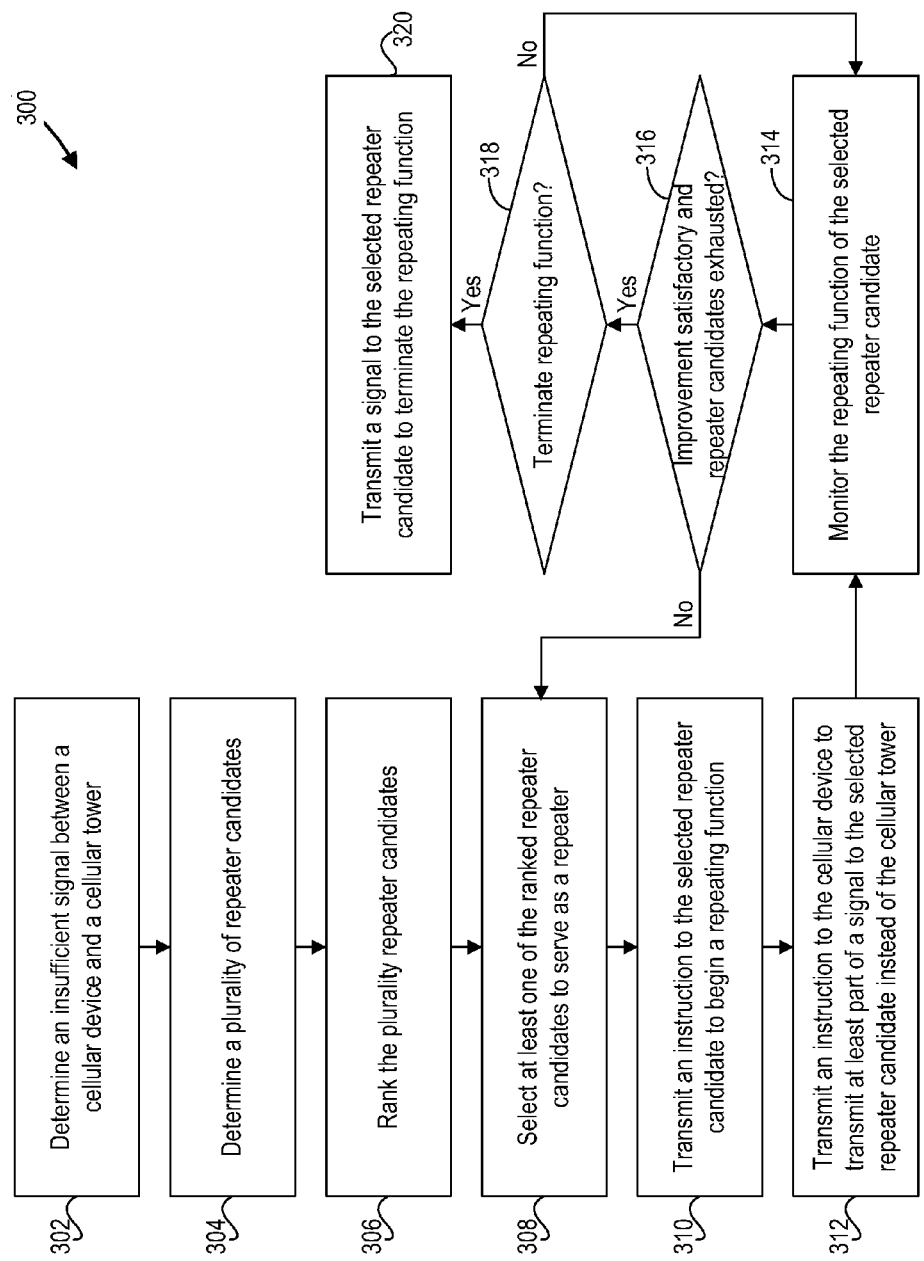
FIG. 3 is a flow diagram illustrating a method for selecting and utilizing a repeater to improve QoS, in accordance with exemplary embodiments.

FIG. 3 is a flow diagram illustrating a method 300 for selecting and utilizing a repeater to improve QoS, in accordance with exemplary embodiments. According to the method 300, the repeater control module 216 determines (at 302) an insufficient signal between the first cellular device 102 and a cellular tower, such as the cellular tower 112. The insufficient signal may be determined based on quality degradation or even a complete loss of the signal or connection between the first cellular device 102 and the cellular tower 112. Quality degradation may include degradation based on bandwidth, signal power, signal-to-noise ratio, jitter, latency and delay, data loss, interference, and combinations thereof. In one embodiment, the insufficient signal is caused by an obstruction, such as the obstruction 108, that affects the signal between the first cellular device 102 and the cellular tower 112.

The repeater control module 216 ranks (at 306) the plurality of repeater candidates 104, 106 based on one or more repeater candidate criteria. In one embodiment, the repeater candidate criteria include measured factors, such as distance and signal strength. In one example, the measured factors may include the distance between the first cellular device 102, the repeater candidates 104, 106, and the cellular tower 112. As illustrated in Figure 1, the distance from the first cellular device 102 to the second cellular device 104 to the cellular tower 112 is less than the distance from the first cellular device 102 to the third cellular device 106 to the cellular tower 112. Since the distance with respect to the second cellular device 104 is shorter than the distance with respect to the third cellular device 106, the second cellular device 104 may be ranked higher than the third cellular device 106. As is known to those skilled in the art, distances may relate to the expected quality or "goodness" of the associated communications links. As a result, shorter distances may rank higher due to better expected communications quality. Alternatively or additionally, the expected quality or "goodness" of communications links can be explicitly measured, as for example by measuring received signal levels and/or signal-to-noise ratio of transmitted signals that may include special test or carrier signals. In another example, the measured factors may include the location geometry with respect to the first cellular device 102, the repeater candidates 104, 106, the obstruction 108, and the cellular tower 112. The location geometry may be based, for example, on a geometric analysis of the connections between the first cellular device and the repeater candidates 104, 106, as well as the connections between the repeater candidates 104, 106 and the cellular tower 112, each with respect to the obstruction 108. The geometric analysis may be based on location information provided by a global positional system ("GPS") device associated with the devices 102, 104, and 106. The geometric analysis may also be based on location information determined based on triangulation or any other method of determining the location of each of the devices 102, 104, 106, as well as the location of the cellular tower 112. Other measured factors may include signal strength and signal-to-noise ratio. In further embodiments, the repeater candidate criteria include non-measured factors, such as policy rules. In one embodiment, the policy rules include rules in a service contract associated with each of the repeater candidates 104, 106 and/or the first cellular device 102. For example, the service contract may specify limitations with respect to the second cellular device 104 and the third cellular device 106 serving as a repeater. It should be understood by those skilled in the art that any type and number of parameters may be used by the repeater control module 216 to rank the repeater candidates 104, 106.

The repeater control module 216 ranks (at 306) the plurality of repeater candidates 104, 106 based on one or more repeater candidate criteria. In one embodiment, the repeater candidate criteria include measured factors, such as distance and signal strength. In one example, the measured factors may include the distance between the first cellular device 102, the repeater candidates 104, 106, and the cellular tower 112. As illustrated in FIG. 1, the distance from the first cellular device 102 to the second cellular device 104 to the cellular tower 112 is less than the distance from the first cellular device 102 to the third cellular device 106 to the cellular tower 112. Since the distance with respect to the second cellular device 104 is shorter than the distance with respect to the third cellular device 106, the second cellular device 104 may be ranked higher than the third cellular device 106. As is known to those skilled in the art, distances may relate to the expected quality or "goodness" of the associated communications links. As a result, shorter distances may rank higher due to better expected communications quality. Alternatively or additionally, the expected quality or "goodness" of communications links can be explicitly measured, as for example by measuring received signal levels and/or signal-to-noise ratio of transmitted signals that may include special test or carrier signals. In another example, the measured factors may include the location geometry with respect to the first cellular device 102, the repeater candidates 104, 106, the obstruction 108, and the cellular tower 112. The location geometry may be based, for example, on a geometric analysis of the connections between the first cellular device and the repeater candidates 104, 106, as well as the connections between the repeater candidates 104, 106 and the cellular tower 112, each with respect to the obstruction 108. The geometric analysis may be based on location information provided by a global positional system ("GPS") device associated with the devices 102, 104, and 106. The geometric analysis may also be based on location information determined based on triangulation or any other method of determining the location of each of the devices 102, 104, 106, as well as the location of the cellular tower 112. Other measured factors may include signal strength and signal-to-noise ratio. In further embodiments, the repeater candidate criteria include non-measured factors, such as policy rules. In one embodiment, the policy rules include rules in a service contract associated with each of the repeater candidates 104, 106 and/or the first cellular device 102. For example, the service contract may specify limitations with respect to the second cellular device 104 and the third cellular device 106 serving as a repeater. It should be understood by those skilled in the art that any type and number of parameters may be used by the repeater control module 216 to rank the repeater candidates 104, 106.

The repeater control module 216 selects (at 308) the second cellular device 104 from the plurality of repeater candidates 104, 106 to serve as a repeater for the first cellular device 102. For example, the repeater control module 216 may select the second cellular device 104 because the second cellular device 104 is higher ranked than the third cellular device 106. The repeater control module 216 transmits (at 310) an instruction to the second cellular device 104 to begin providing a repeating function for the first cellular device 102. The instruction may include information identifying the first cellular device 102 to the second device 104. In one embodiment, the repeating function refers to the second cellular device 104 receiving a signal from the first cellular device 102 and retransmitting the signal to the cellular tower 112, and vice versa, for communications from the cellular tower 112 to the first cellular device 102. The first cellular device 102 and the second cellular device 104 may initiate communications via a suitable handshaking protocol and a suitable authentication protocol. In one embodiment, the repeater control module 216 transmits (at 312) an instruction to the first cellular device 102 to transmit at least part of the signal to the second cellular device 104. In a further embodiment, the second cellular device 104 may instruct the first cellular device 102 during the handshake and authentication protocols to transmit at least part of the signal to second cellular device 104. The repeater control module 216 monitors (at 314) the repeating function provided by the second cellular device 104 to measure the improvement, if any, resulting from the second cellular device 104 serving as a repeater. The improvement may be determined based on increased data rate and other suitable QoS-related factors such as one or more of reduced jitter, reduced delay and latency, reduced data loss, and the like.

In one embodiment, two or more repeater candidates 104, 106 may be selected and utilized in conjunction to provide the repeating function. By utilizing multiple repeater candidates 104, 106 in conjunction, the potential for excessive battery consumption and unfair reliance on each repeater candidate 104, 106 may be reduced. For example, frequency multiplexing or time slotting may be used to allocate a given amount of resources of each repeater candidate 104, 106 so as to spread the repeating activity between them in order to provide the repeating function.

The repeater control module 216 determines (at 316) whether the improvement is satisfactory and if all the repeater candidates 104, 106 are exhausted. The improvement may initially be satisfactory, but may become unsatisfactory if, for example, a degradation in the signal transmitted from the second cellular device 104 to the cellular tower 112 or a degradation in the signal transmitted between the first cellular device 102, and the second cellular device 104 is detected or policy rules (e.g., the service contract) associated with the first cellular device 102 and/or the second cellular device 104 are violated. The degradation in the signal may be detected by the system 200, the first cellular device 102, or the second cellular device 104. Signal degradation may occur for any number of reasons including, but not limited to, changes in the noise environment as well as changes in the distances associated with the communications links caused by the movement of users. If, for example, the first cellular device 102 detects the degradation in the signal, the first cellular device 102 may notify the repeater control module 216 of the degradation and/or request termination of the repeating function. If, for example, the second cellular device 104 detects the degradation in the signal, the second cellular device 104 may notify the repeater control module 216 of the degradation, request termination of the repeating function, and/or self-terminate due to the degradation.

Further, the improvement may become unsatisfactory if the charge of the battery on the second cellular device 104 drops to a critical level or if the second cellular device 104 no longer has an unobstructed or sufficiently less-obstructed second link 114 to the cellular tower 112. In response to determining that the improvement is not satisfactory and that the repeater candidates are not exhausted, the repeater control module 216 selects (at 308) the next repeater candidate from the ranked plurality of repeater candidates 104, 106. For example, the repeater control module 216 may select the third cellular device 106. The operations 308, 310, 312, 314, and 316 may be repeated until a satisfactory improvement is determined or until all the repeater candidates are exhausted.

In response to determining that the improvement is satisfactory, the repeater control module 216 determines (at 318) whether to terminate the repeating function. The repeating function may be terminated if the first cellular device 102 no longer needs the repeating function or if the repeating function can no longer provide a satisfactory improvement. In one embodiment, the first cellular device 102 transmits an indication to the repeater control module 216 that the second cellular device 104 is no longer needed to provide the repeating function. In a further embodiment, the repeater control module 216 analyzes suitable metrics to determine whether the repeating function is beneficial. If the repeater control module 216 determines not to terminate the repeating function, the repeater control module 216 returns to operation 314 and continues utilizing the second cellular device 104 as the repeater for the first cellular device 102. If the repeater control module 216 determines to terminate the repeating function, the repeater control module 216 transmits (at 320) a signal to the second cellular device 104 to deactivate the repeating function. The repeater control module 216 may also transmit a signal to the first cellular device 102 that the second cellular device 104 is deactivating the repeating function. The second cellular device 104 may also self-terminate due to hardship from providing the repeating function.

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for utilizing a repeating function to improve quality of service between a cellular service provider and a second mobile cellular device, comprising:
   identifying an insufficient signal between the second cellular device and a base station coupled to the second cellular device;
   determining a plurality of repeater candidates configured to resolve the insufficient signal by relaying communications between the second mobile cellular and the base station;
   ranking the plurality of repeater candidates by a plurality of ranks according to a distance of the repeater candidates to the base station and a signal strength of each of the plurality of repeater candidates, each of the plurality of repeater candidates associated with one of the plurality of ranks;
   selecting a first mobile cellular device in the plurality of repeater candidates having a highest rank in the plurality of ranks as a repeater between the second cellular device and the base station;
   transmitting, from the base station coupled to the first mobile cellular device and the second mobile cellular device, a first instruction to the first mobile cellular device, the first instruction causing the first mobile cellular device to relay communications between the second mobile cellular device and the cellular service provider the first mobile cellular device thereby providing the repeating function for the second mobile cellular device;
   upon transmitting, from the base station, the first instruction to the first mobile cellular device, measuring an improvement to the insufficient signal between the second cellular device and the base station;
   determining whether the improvement to the insufficient signal is unsatisfactory;
   in response to determining that the improvement to the insufficient signal is unsatisfactory, selecting a third mobile cellular device in the plurality of repeater candidates having a second highest ranking in the plurality of ranks as the repeater between the second cellular device and the base station; and
   in response to determining that the improvement to the insufficient signal is satisfactory, transmitting, from the base station, a second instruction to the first mobile cellular device, the second instruction causing the first mobile cellular device to stop relaying communications between the second mobile cellular device and the cellular service provider, the first mobile cellular device thereby terminating the repeating function for the second mobile cellular device.

2. The method of claim 1, wherein the repeating function comprises:
   receiving at least a portion of a signal from the second mobile cellular device; and
   retransmitting the at least a portion of the signal to the base station.

3. The method of claim 2, further comprising:
   transmitting a third instruction to the second mobile cellular device, the third instruction notifying the second mobile cellular device to transmit the signal to the first mobile cellular device.

4. The method of claim 1, further comprising:
   initializing a handshake protocol between the first mobile cellular device and the second mobile cellular device.

5. A system for utilizing a repeating function to improve quality of service between a cellular service provider and a second mobile cellular device, comprising:
   a memory for storing a program containing code for utilizing a repeater;
   a processor functionally coupled to the memory, the processor being responsive to computer-executable instructions contained in the program and operative to:

identify an insufficient signal between the second cellular device and a base station coupled to the second cellular device,
determine a plurality of repeater candidates configured to resolve the insufficient signal by relaying communications between the second mobile cellular and the base station,
rank the plurality of repeater candidates by a plurality of ranks according to a distance of each of the plurality of repeater candidates to the base station and a signal strength of each of the plurality of repeater candidates, each of the plurality of repeater candidates associated with one of the plurality of ranks,
select a first mobile cellular device in the plurality of repeater candidates having a highest rank in the plurality of ranks as a repeater between the second cellular device and the base station,
transmit a first instruction to the first mobile cellular device, the first instruction causing the first mobile cellular device to relay communications between the second mobile cellular device and the cellular service provider, the first mobile cellular device thereby providing the repeating function for the second mobile cellular device,
upon transmitting the first instruction to the first mobile cellular device measure an improvement to the insufficient signal between the second cellular device and the base station,
determine whether the improvement to the insufficient signal is unsatisfactory,
in response to determining that the improvement to the insufficient signal is unsatisfactory select a third mobile cellular device in the plurality of repeater candidates having a second highest ranking in the plurality of ranks as the repeater between the second cellular device and the base station, and
in response to determining that the improvement to the insufficient signal is satisfactory, transmit, from the base station, a second instruction to the first mobile cellular device, the second instruction causing the first mobile cellular device to stop relaying communications between the second mobile cellular device and the cellular service provider, the first mobile cellular device thereby terminating the repeating function for the second mobile cellular device.

6. The system of claim 5, wherein to provide the repeating function, the first mobile cellular device receives at least a portion of a signal from the second mobile cellular device, and retransmits the at least a portion of the signal to the base station.

7. The system of claim 6, the processor being further operative to:
transmit a third instruction to the second mobile cellular device, the third instruction notifying the second mobile cellular device to transmit the signal to the first mobile cellular device.

8. A non-transitory computer readable medium having instructions stored thereon for execution by a processor to provide a method for utilizing a repeating function to improve quality of service between a cellular service provider and a second mobile cellular device, the method comprising:
identifying an insufficient signal between the second cellular device and a base station coupled to the second cellular device;
determining a plurality of repeater candidates configured to resolve the insufficient signal by relaying communication between the second mobile cellular and the base station;
ranking the plurality of repeater candidates by a plurality of ranks according to a distance of each of the plurality of repeater candidates to the base station and a signal strength of each of the plurality of repeater candidates, each of the plurality of repeater candidates associated with one of the plurality of ranks;
selecting a first mobile cellular device in the plurality of repeater candidates having a highest rank in the plurality of ranks as a repeater between the second cellular device and the base station;
transmitting, from the base station coupled to the first mobile cellular device and the second mobile cellular device, a first instruction to the first mobile cellular device, the first instruction causing the first mobile cellular device to relay communications between the second mobile cellular device and the cellular service provider, the first mobile cellular device thereby providing the repeating function for the second mobile cellular device;
upon transmitting, from the base station, the first instruction to the first mobile cellular device, measuring an improvement to the insufficient signal between the second cellular device and the base station;
determining whether the improvement to the insufficient signal is unsatisfactory;
in response to determining that the improvement to the insufficient signal is unsatisfactory, selecting a third mobile cellular device in the plurality of repeater candidates having a second highest ranking in the plurality of ranks as the repeater between the second cellular device and the base station; and
in response to determining that the improvement to the insufficient signal is satisfactory, transmitting, from the base station, a second instruction to the first mobile cellular device, the second instruction causing the first mobile cellular device to stop relaying communications between the second mobile cellular device and the cellular service provider, the first mobile cellular device thereby terminating the repeating function for the second mobile cellular device.

9. The non-transitory computer readable medium of claim 8, wherein the repeating function comprises:
receiving at least a portion of a signal from the second mobile cellular device; and
retransmitting the at least a portion of the signal to the base station.

10. The non-transitory computer readable medium of claim 9, the method further comprising:
transmitting a third instruction to the second mobile cellular device, the third instruction notifying the second mobile cellular device to transmit the signal to the first mobile cellular device.

11. The non-transitory computer readable medium of claim 8, the method further comprising:
initializing a handshake protocol between the first mobile cellular device and the mobile cellular device.

* * * * *

UNITED STATES PATENT AND TRADEMARK OFFICE
CERTIFICATE OF CORRECTION

| | |
|---|---|
| PATENT NO. | : 8,265,550 B2 |
| APPLICATION NO. | : 11/864293 |
| DATED | : September 11, 2012 |
| INVENTOR(S) | : Jeffrey A. Aaron |

It is certified that error appears in the above-identified patent and that said Letters Patent is hereby corrected as shown below:

In Claim 1, Column 10, Line 6, please add --of each of the plurality-- after the phrase "according to a distance" and delete "the" before the word "repeater".

In Claim 11, Column 12, Line 61, please add --second-- before the phrase "mobile cellular device.".

Signed and Sealed this
Twenty-seventh Day of November, 2012

David J. Kappos
*Director of the United States Patent and Trademark Office*